Dec. 28, 1926.  
J. E. TOM  
1,612,550  
VALVE HEAD FOR INTERNAL COMBUSTION ENGINES  
Filed Sept. 26, 1923   5 Sheets-Sheet 1

Inventor  
John E. Tom,  
Attorneys

Dec. 28, 1926.  
J. E. TOM  
1,612,550  
VALVE HEAD FOR INTERNAL COMBUSTION ENGINES  
Filed Sept. 26, 1923   5 Sheets-Sheet 2

Inventor  
John E. Tom,  
By  
Attorneys

Dec. 28, 1926.  
J. E. TOM  
1,612,550  
VALVE HEAD FOR INTERNAL COMBUSTION ENGINES  
Filed Sept. 26, 1923     5 Sheets-Sheet 3
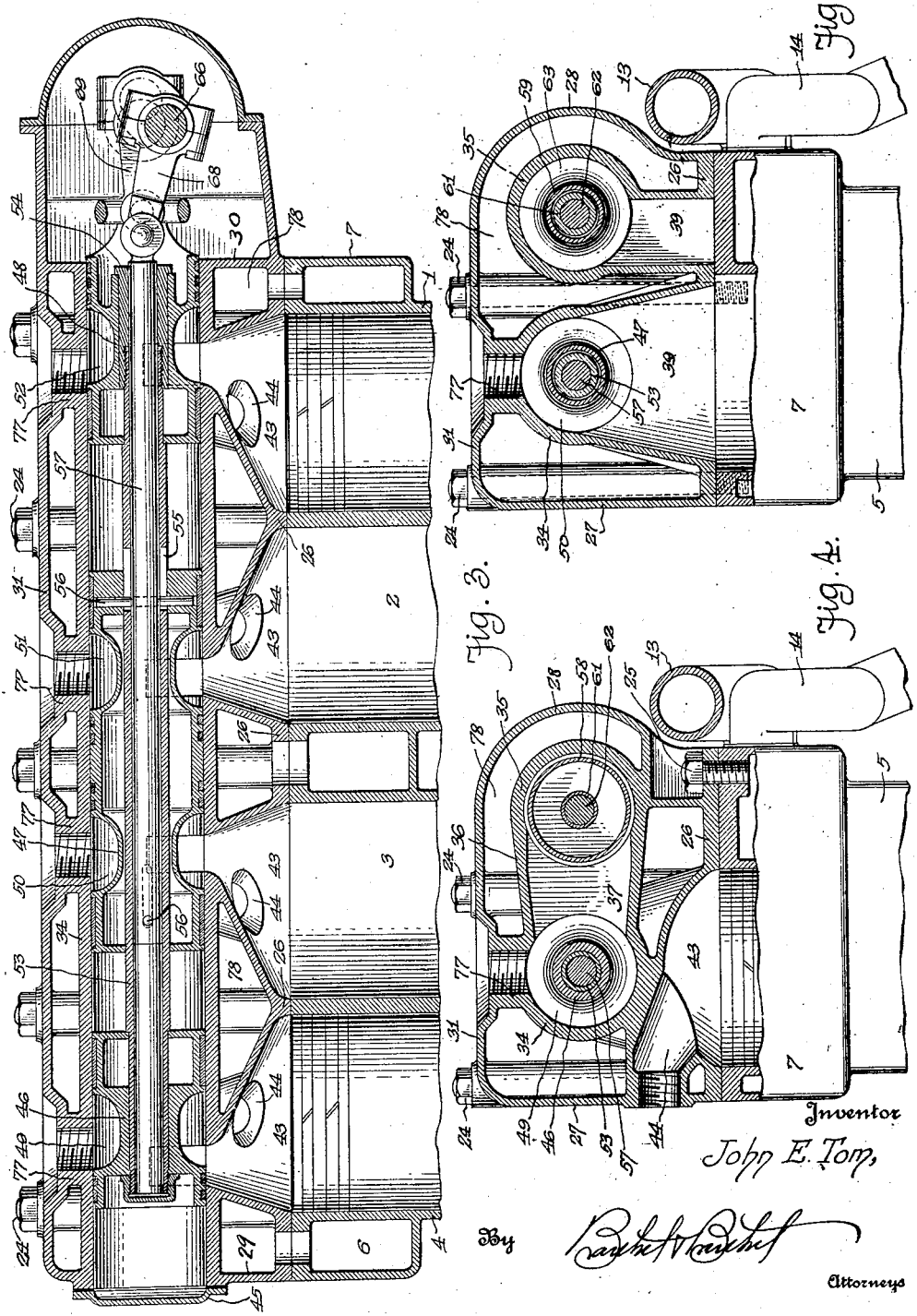
Inventor  
John E. Tom,  
By  
Attorneys Dec. 28, 1926.

J. E. TOM 1,612,550

VALVE HEAD FOR INTERNAL COMBUSTION ENGINES

Filed Sept. 26, 1923   5 Sheets-Sheet 5

Inventor
John E. Tom,
By
Attorneys

Patented Dec. 28, 1926.

1,612,550

UNITED STATES PATENT OFFICE.

JOHN E. TOM, OF SANDUSKY, OHIO.

VALVE HEAD FOR INTERNAL-COMBUSTION ENGINES.

Application filed September 26, 1923. Serial No. 664,842.

My invention aims to improve the operating characteristics of an engine and provide a valve head for internal combustion engines, particularly engines of a well known type that may or may not be in use, the valve head being designed so that it may be readily substituted for the usual cylinder head, without material modification or change, thus permitting of engines being rebuilt and cylinder blocks used that otherwise might be discarded.

My invention further aims to provide a valve head embodying a strong and durable construction that may be characterized in the following particulars.

First, the valve head includes parallel longitudinal valve casings, water cooled, and communicating with passages by which fuel may pass through both of said valve casings to cylinders and burned gases exhaust from the cylinders through both of said valve casings.

Second, there are novel reciprocable valves in each valve casing of the valve head, said reciprocable valves being provided with concentric actuating members operatable from one end of the valve head, and the reciprocable valves of said casings are constructively arranged to cooperate in controlling passage of fuel and exhaust gases through said valve casings. The arrangement of the reciprocable valves is such that passages may be positively sealed to preclude any leakage and in some instances there is a double sealing which contributes towards the efficiency of the engine.

Third, the constructive arrangement of valve units and their actuating members whereby independent reciprocating motion may be imparted to said units in timed relation to a multi-cylinder internal combustion engine.

The above are a few of the features of my valve head, and others will appear as the nature of the invention is better understood by aid of the drawings, wherein—

Fig. 3 is a longitudinal sectional view taken on the line III—III of Fig. 1, showing the combustion chambers relative to one set of valves;

Fig. 4 is a cross sectional view taken on the line IV—IV of Fig. 1;

Fig. 5 is a similar view taken on the line V—V of Fig. 1, and

Figure 1:
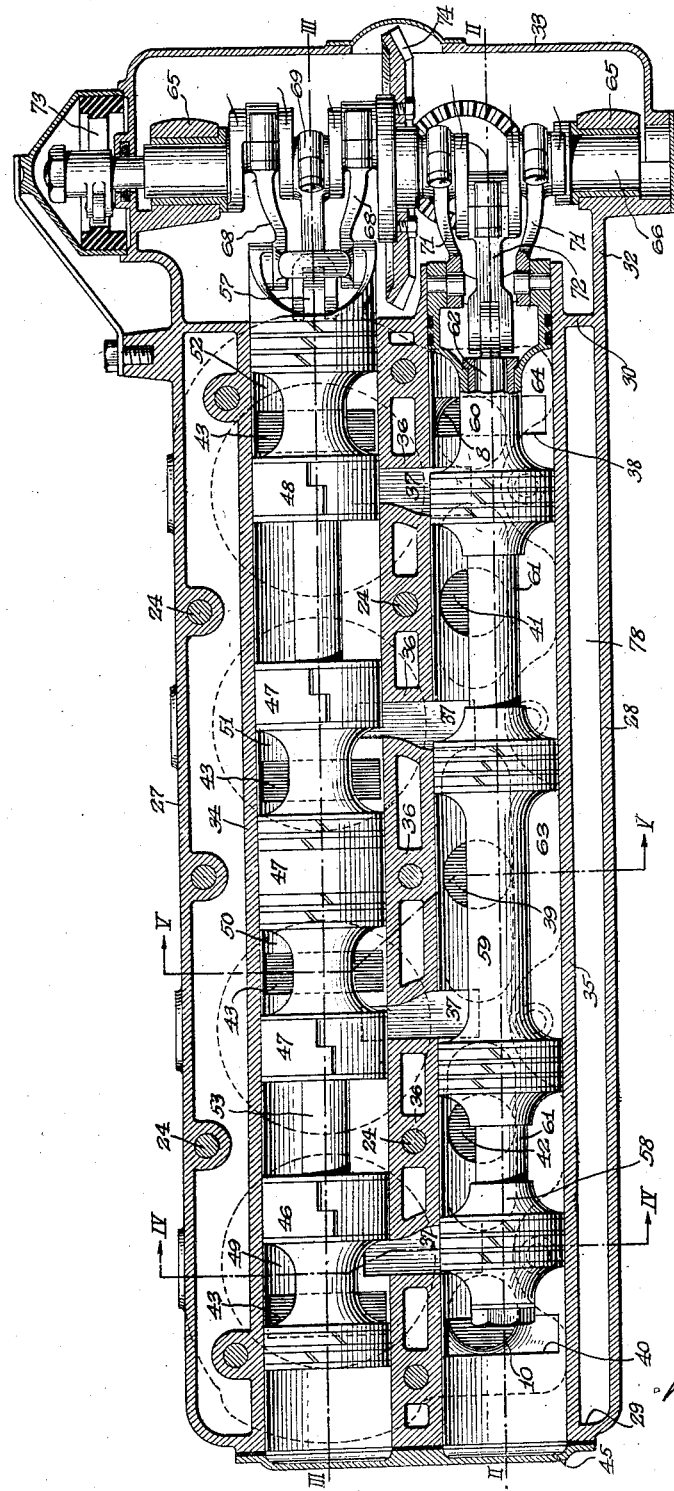
Figure 1 is a horizontal sectional view of a valve head in accordance with my invention.
Figure 2:
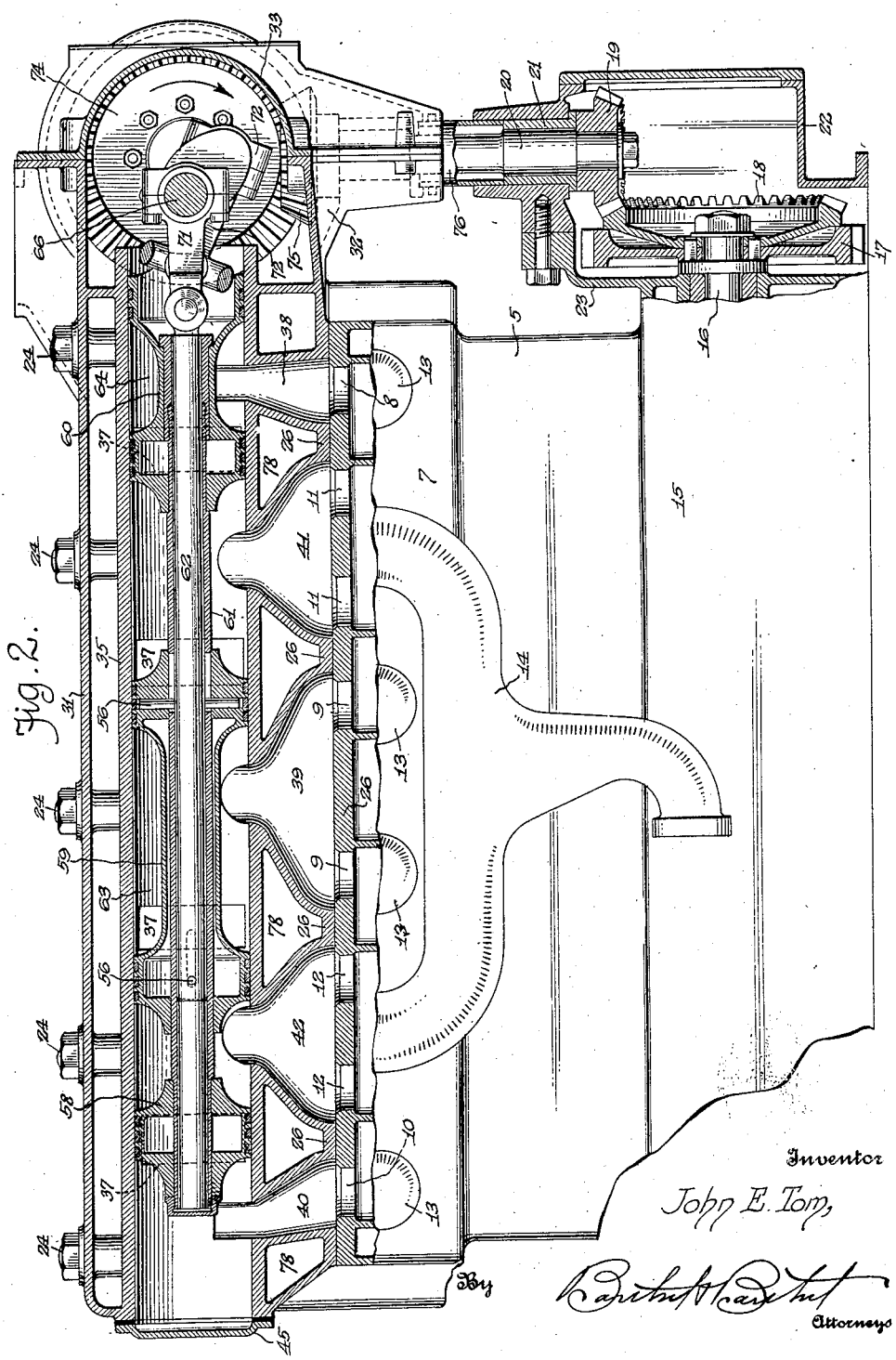
Fig. 2 is a longitudinal sectional view of the valve head, taken on the line II—II of Fig. 1, illustrating the valve operating mechanism.
Figure 6:
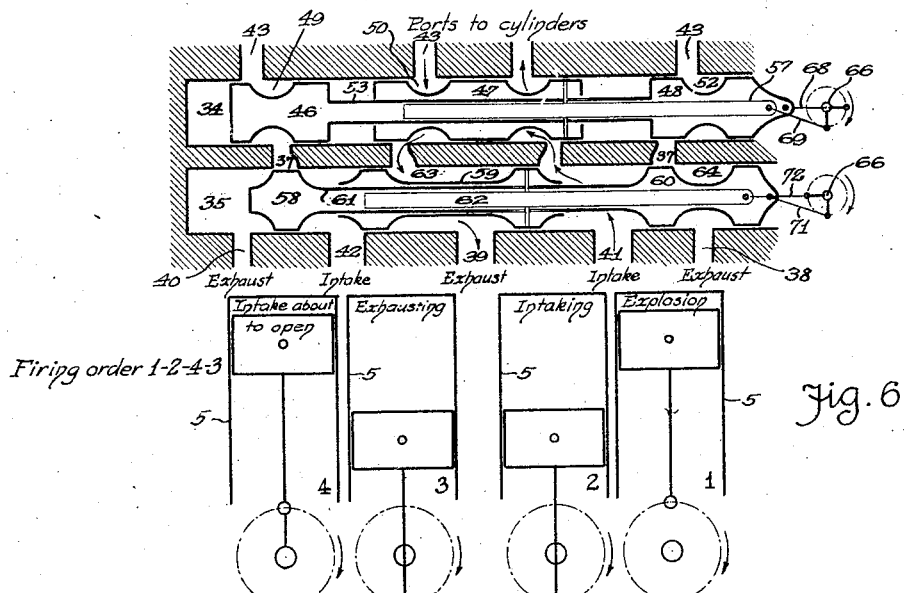
Figure 7:
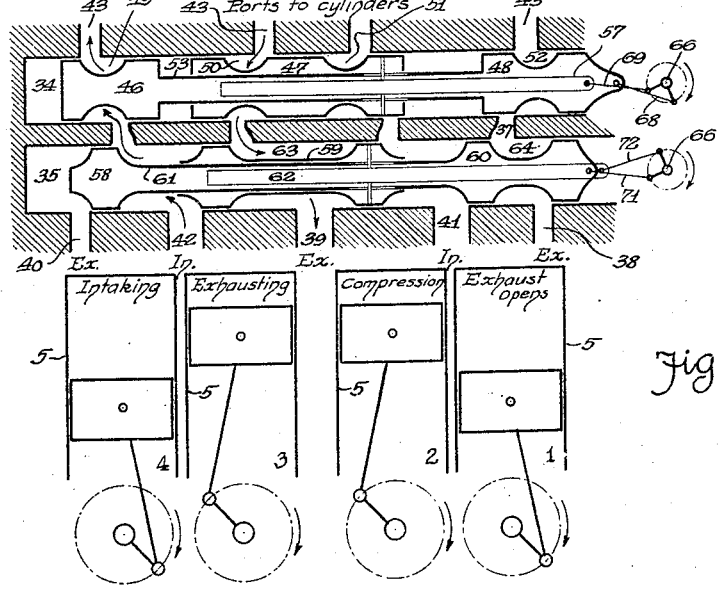
Figure 8:
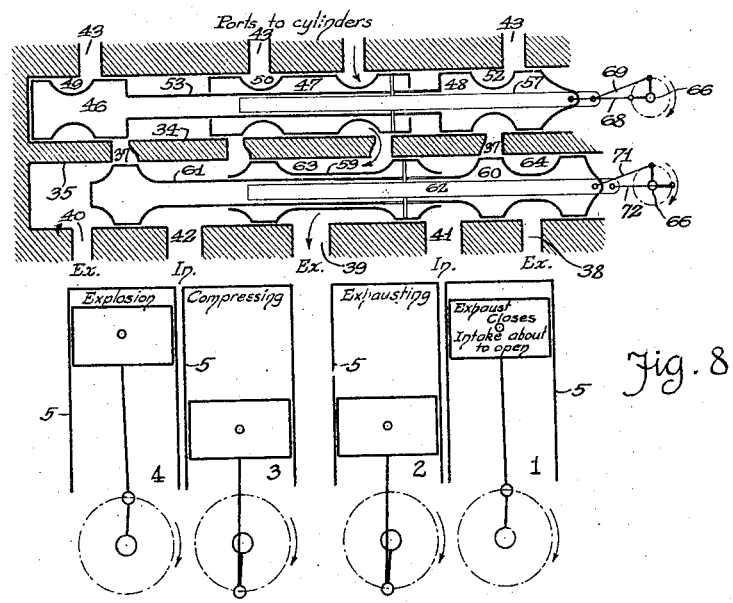
Figure 9:
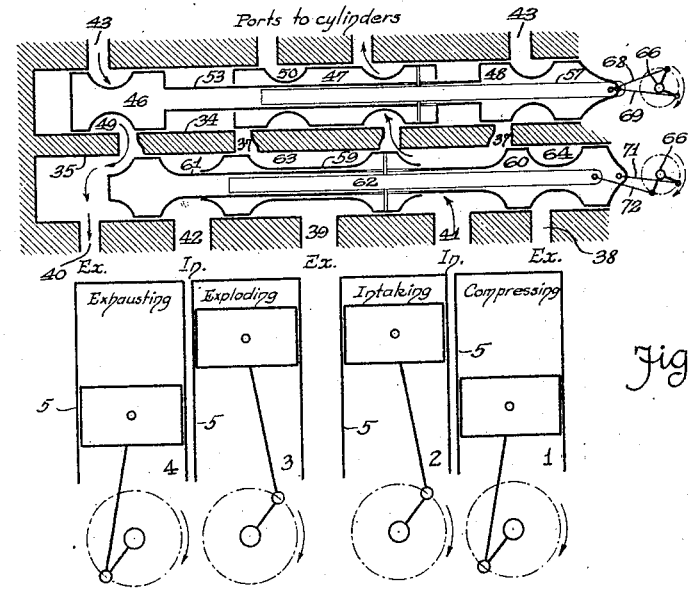

Figs. 6 to 9 inclusive are diagrammatic views of the valve head showing approximately the various positions of the reciprocable valves relative to cylinder pistons of an engine of the multi-cylinder type having a firing order of one, two, four and three.

In the drawings, the reference numeral 5 denotes a conventional form of cylinder block having cylinders 1, 2, 3 and 4, with the upper ends thereof surrounded by a water jacket 6. At one side of the cylinder block 5 is the usual partitioned offset portion 7 provided with top exhaust openings 8, 9 and 10 and intake openings 11 and 12. Communicating with the offset portion 7 and the exhaust openings 8, 9 and 10 thereof is an exhaust manifold 13 and communicating with the offset portion 7 and the intake openings 11 and 12 thereof is an intake manifold 14 adapted to be connected to a carburetor or other fuel supplying device. Such may be considered a well known type of internal combustion engine from which the usual head has been removed, leaving the upper ends of the cylinders and the intake and exhaust openings open to be covered by my new valve head having chambers for communication with the cylinders and passages for communication with the intake and exhaust openings.

Below the cylinder block 5 is the usual crank case 15 and suitably journaled in this crank case is a valve operating shaft 16, corresponding to the usual cam shaft. Since the poppet valves have been removed with the head, other valve parts can also be removed and openings plugged. The old cam shaft may be used, or the shaft 16 substituted therefor. On one end of the valve operating shaft 16 is a large gear wheel 17 by which the shaft 16 is driven from the crank shaft of the engine. Fixed on the shaft 16, at the side of the large gear wheel 17, is a large beveled gear wheel 18 meshing with a small beveled gear wheel 19, carried by a vertically disposed shaft 20, said shaft being journaled in a bushing 21 forming part of a casing 22 mounted on the end of the crank case 15. The casing 22 cooperates with an enlarged end 23 of the crank case 15 in housing the gear wheels 17, 18 and 19, the usual timer or commutator has not been shown, but the casing 22 will provide clearance for it on the end of the shaft 16 or said shaft may be of such length as to extend through the casing and permit of the timer being mounted exteriorly of the casing convenient for adjustment.

Mounted on top of the cylinder block 5 and secured thereto by a plurality of long screw bolts 24 and short screw bolts 25 is a cylinder head, comprising a bottom wall 26, side walls 27 and 28, end walls 29 and 30 and a top wall 31, said walls being preferably integral with the end wall 30 provided with an integral housing 32 cooperating with a detachable side plate 33 in providing a housing above the casing 22.

Connecting the end walls 29 and 30 and extending in parallelism are tubular valve casings 34 and 35, the former being above the cylinders of the engine with the axis of the valve casing 34 intersecting the axes of the cylinders 1 to 4 inclusive. The valve casing 35 is above the offset portion 7 of the cylinder block and said valve casing is connected to the valve body 34 by web portions 36 through some of which extend some of the screw bolts 24 and through other of which are lateral passages 37 establishing communication between the valve casings 34 and 35, said lateral passages corresponding in number to the cylinders of the engine.

Connecting the bottom of the valve casing 35 and the bottom wall 26 of the cylinder head are walled exhaust passages 38, 39 and 40, communicating with the exhaust openings 8, 9 and 10 of the offset portion 7 and placing these exhaust openings in communication with the valve casing 35. Establishing communication between the valve casing 35 and the intake openings 11 and 12 of the offset portion 7 are walled intake passages 41 and 42, the passages 39, 41 and 42 being somewhat dome shaped.

Connecting the bottom of the valve casing 34 and the bottom wall 26 of the cylinder head and establishing communication between the engine cylinders and said valve casing are combustion chambers 43, said chambers being somewhat conical and connected to the side wall 27 by spark plug sockets 44.

The valve casings 34 and 35 are opened at the end wall 29 of the cylinder head and mounted over the open ends of said valve casings is a detachable cover plate 45.

Reciprocable in the valve casing 34 are valves 46, 47 and 48, each being in the form of a piston with the periphery of the valve 46 provided with an annular channel 49; the periphery of the valve 47 provided with annular channels 50 and 51 and the periphery of the valve 48 provided with an annular channel 52. The peripheries of all of the piston like valves may have wide or narrow piston rings or packings of a conventional form insuring a non-leakable connection between the valves and the wall of a valve casing 34, so that the spaces between the valves and the annular channels thereof are positively isolated.

The valves 46, 47 and 48 are substantially hollow and the valve 46 is mounted on the inner reduced end of the tubular actuating member 53 extending axially of the valves and terminating in the valve 48 where it is connected to a bushing 54 securing the valve 48 on the reduced outer end of the tubular actuating member 53. This tubular actuating member has opposed longitudinal slots 55 for transverse pins 56 carried by an inner actuating member slidable in the tubular or outer actuating member 53, but not in frictional contact therewith. The pins 56 extend into the ends of the intermediate valve 47, this valve being slidable, without frictional contact, on the outer actuating member 53 so that it may be adjusted on said member by the inner actuating member 57.

Reciprocable in the valve casing 35 are valves 58, 59 and 60, the valves 58 and 60 being mounted on an outer tubular actuating member 61 for movement in synchronism therewith, and the valve 59 is slidable longitudinal of the outer actuating member 61 and is shifted by an inner actuating member 62, said actuating members and valves being somewhat similar to those in the valve casing 34. The valves 59 and 60 have channels 63 and 64 respectively and spaces between said valves or between the valve 58 and the cover plate 45 will serve as channels, as will hereinafter appear when considering Figs. 6 to 9 inclusive.

The housing 32 is provided with transversely alining bearings 65 and journaled in said bearings is a crank shaft 66 having crank portions connected by connecting rods 68 to the valve 48 for reciprocating said valve and the outer actuating member 53 on which the valve 46 is mounted. Another crank portion of the shaft 66 is connected by a connecting rod 69 to the outer end of the inner actuating member 57 so that this member may reciprocate the valve 47, by means of pins 56.

Other crank portions of the shaft 66 are connected by a connecting rod 71 to the valve 60 and by virtue of the outer actuating member 61 to the valve 58. Another crank portion of the shaft 66 is connected by a connecting rod 72 to the end of the inner actuating member 62, so that this member may reciprocate the valve 59, by means of pins 56 all of which is best shown in Fig. 1.

At one end of the crank shaft 66 is a conventional form of timer 73 and intermediate the ends of said crank shaft is a large beveled gear wheel 74 meshing with a small beveled gear wheel 75 mounted on the upper end of the shaft 20, said shaft being enclosed in a tube 76 connecting the lower part of the housing 32 to the upper part of the casing 22. The shaft 20 is driven at approximately the same speed as the crank shaft of the engine, and the gears are suitably designed to drive the crank shaft 66 at proper multiple or subdivision of engine speed to insure correct value timing and firing.

The upper wall 31 of the cylinder head may be connected to the top of the valve casing 34 by spark plug sockets 77, which together with the spark plug sockets 44 will permit of a dual ignition system being used in connection with the engine.

The space about the valve casings 34 and 35 affords a water jacket 78 communicating with the water jacket 6 of the cylinder block.

Considering Figs. 6 to 9 inclusive, these views are self explanatory as arrows indicate the intake of fuel and the exhaust of burned gases during a cycle of the engine, the relative positions of the valves being shown for different positions of the engine pistons, and in all instances it will be noted that the intake of fuel or the exhaust of burned gases is through the valve casings 34 and 35, with the two sets of valves positively controlling the passages of the cylinder head.

I desire to direct attention to the fact that valves 58, 59 and 60, act as transfer valves, compelling gas travel into the cylinder combustion chambers 43 from the intake passages 41 and 42, or from the combustion chambers after combustion, out through the exhaust passages 38, 39, 40, as called for by the proper timing relations with the engine pistons. Furthermore, that, aside from the actual combustion chamber, per se, the only passage common to both fresh intake and burned exhaust gases, is the short passageway 37. This in contradistinction to designs, necessitating lengthy common passages for fresh and burned gases, whereby a trapping action occurs, thus impairing the operating efficiency of the engine.

Again, the fact that the valve casings are two in number, with the axes thereof in parallelism, said valve casings serve a multi-cylinder engine of two or more cylinders, such being in contradistinction to a valve casing for each cylinder or valve casings containing rotary or oscillatory valves. With the valve casings disposed in parallelism it is possible to place said valve casings in communication by ports or passages at a right angle to the axis of each valve body and by using valves of the piston type in said valve casings there is sufficient supporting structure for packing rings on the valves in the valve casings to insure positive isolation of certain ports or passageways relative to others. In using the piston type of valves I also obviate the necessity of providing such valves with transverse passageways, that is, passageways through the valves. By using peripheral channels as passageways there is no interference with actuating members that may extend axially of the valves to permit of the valves being placed in axial relation. By using more than one valve in a valve casing and imparting separate and distinct motions to each set of valves in the same valve casing, I reduce the overall dimensions of a valve head, casing or other structure relative to an engine cylinder block. This feature also provides a great simplification of construction, and improvement in operating efficiency, in that by obtaining in effect multiple valve action in the same valve casing, it is possible to use straight, short and direct passages throughout for the intake and for the exhaust gases. This is contradistinction to designs of positively connected and unit-actuated valves in valve casings requiring for their operation some system of crossed gas passages, either internal in the cylinder head, or external in the form of manifolds. It is in this connection that my valve head has proven satisfactory on a well known type of automobile engine having parts that are easily disassembled and readily obtained. The substitution of my engine head for the usual head can be easily accomplished because my engine head is a bench assembled structure that may be bodily installed and the additions to the usual engine, for driving the valves from the usual cam shaft or substituted shaft, can be easily and quickly installed. The arrangement of valves is such that the valves function as distributors or transfer means for the gases. It is by virtue of the valve operating mechanism that there is a maximum valve velocity at the time of opening and closing of the ports, and because of the spool shape of the valves, said valves are perfectly balanced regardless of the pressure under which they operate. Also, because of the valve action, a negligible minimum volume of gases is trapped in the passage common to intake and exhaust gases. The volume of trapped gases is so small as to be negligible with reference to the efficiency of the engine.

It is though that the operation and utility of my invention will be understood, without entering into a lengthy description of the valve operation, and while in the drawings there is illustrated a preferred embodiment of my invention, it is to be understood that the structural elements are susceptible to such changes as fall within the scope of the appended claims.

What I claim is:—

1. An engine head including parallel valve casings adapted to have fuel and burned gases pass from one to the other during the admission of fuel to an engine and the exhaust of burned gases therefrom, reciprocable valves in each valve casing, and means at an end of said head adapted to reciprocate said valves, said valves including concentric actuating members articulated with said means and with said valves so that some of said valves may be reciprocated independent of others.

2. An engine head including communicating valve casings with combustion chambers and passages communicating with said valve casings to permit of fuel and burned gases passing through both of said valve casings to and from the combustion chambers and passages of the engine head, reciprocable valves in each valve casing controlling the passage of fuel and burned gases therethrough with some of said valves arranged to be reciprocated independent of others, and means at one end of said engine head adapted to reciprocate said valves, said valves being of the piston type with concentric actuating members axially of said valves and articulated with said means.

3. In a multi-cylinder engine, a head adapted to be mounted on the cylinder block of the engine and provided with combustion chambers and passages serving the cylinders and intake and exhaust openings of the engine block, parallel valve casings in said head communicating with each other and with the combustion chambers and passages of said head, concentric actuating members in each valve casing, valves of the piston type slidable in said valve casings, and connected to said actuating members so that some of said valves may be moved independently of others, and means connected to the ends of said actuating members at one end of said head adapted for reciprocating said valves.

4. An engine as called for in claim 3, wherein some of said valves are provided with annular channels adapted to communicate with the combustion chambers and passages of said head.

5. In a multi-cylinder engine, a head having combustion chambers and passages serving the cylinders and intake and exhaust openings of the engine, valve casings in said head communicating with each other and with the combustion chambers and passages of said head, inner and outer actuating members axially of each valve casing, valves fixed on the outer actuating members of said valve casings, valves slidable longitudinally of the outer actuating members of said valve casings and connected to the inner actuating members of said valve casings, and means adapted to reciprocate said actuating members and the valves thereof in timed relation to the firing order of the engine.

6. In a multi-cylinder engine, parallel valve casings on the engine with one of said valve casings having its axis approximately in a plane common to all the axes of the engine cylinders, said valve casings communicating with each other by ports at a right angle to the axes of said valve casings, co-axial valves slidable in each valve casing, and actuating means for some of said valves extending through the other of said valves.

7. The combination with an engine from which the usual head has been removed to leave the usual row of valve seat openings and row of open ended cylinders, of a head substituted for the usual head, said head including valve casings having passages adapted to communicate with the row of open end cylinders of the engine, and other passages by which gas and burned gases may be supplied to and exhausted from the row of valve seat openings of the engine, sets of slide valves controlling the intake and exhaust gases, one set of slide valves having its axis approximately in a vertical plane common to all the engine cylinders, the other set of valves having axes approximately in a vertical plane common to all of the valve seat openings of the engine, and the passages disposed so that gases to and from the engine cylinders are controlled by both sets of valves, and means for actuating said valves in timed relation to the firing order of the engine.

In testimony whereof I affix my signature.

JOHN E. TOM.